US011676315B2

(12) United States Patent
Black et al.

(10) Patent No.: US 11,676,315 B2
(45) Date of Patent: *Jun. 13, 2023

(54) GENERATING SIMPLIFIED MAP SHAPES

(71) Applicant: Target Brands, Inc., Minneapolis, MN (US)

(72) Inventors: Clayton Black, Minneapolis, MN (US); Michael Lissick, Minneapolis, MN (US); Eric Runquist, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/357,746

(22) Filed: Jun. 24, 2021

(65) Prior Publication Data

US 2021/0319605 A1  Oct. 14, 2021

Related U.S. Application Data

(63) Continuation of application No. 16/717,541, filed on Dec. 17, 2019, now Pat. No. 11,074,729.

(60) Provisional application No. 62/782,070, filed on Dec. 19, 2018.

(51) Int. Cl.
  *G06T 11/20* (2006.01)
  *G06F 16/29* (2019.01)
  *G06T 11/60* (2006.01)

(52) U.S. Cl.
  CPC ............ *G06T 11/206* (2013.01); *G06F 16/29* (2019.01); *G06T 11/60* (2013.01)

(58) Field of Classification Search
  CPC ......... G06F 16/29; G06T 11/206; G06T 11/60
  See application file for complete search history.

(56) References Cited

U.S. PATENT DOCUMENTS

| 6,026,377 A | 2/2000 | Burke |
| 10,157,331 B1 | 12/2018 | Tang et al. |
| 2012/0035897 A1 | 2/2012 | Bell |
| 2012/0116678 A1 | 5/2012 | Witmer |
| 2015/0070397 A1 | 3/2015 | Miller |

(Continued)

OTHER PUBLICATIONS developers.google.com [online], "Developer Guide," [retrieved on Dec. 16, 2019], retrieved from: URL <https://developers.google.com/maps/documentation/maps-static/dev-guide>, 32 pages.

(Continued)

*Primary Examiner* — Sing-Wai Wu
(74) *Attorney, Agent, or Firm* — Barnes & Thornburg LLP

(57) ABSTRACT

In some implementations, a method performed by data processing apparatuses includes receiving map data that identifies a layout of physical objects within a physical area, identifying contiguous groups of the physical objects as composite objects, selecting bounding algorithms to use for generating graphical shapes for the composite objects, generating graphical shapes by applying the selected bounding algorithms to the composite objects, and testing the graphical shapes against one or more criteria. For candidate graphical shapes that fail a test, a new bounding algorithm can be selected and the generating and the testing can be repeated using the new bounding algorithm. A simplified graphical map can be output that represents the physical objects within the physical area using the graphical shapes.

20 Claims, 11 Drawing Sheets

(56) References Cited

U.S. PATENT DOCUMENTS

2015/0187337 A1 7/2015 Baxter et al.
2017/0323365 A1 11/2017 Jones et al.

OTHER PUBLICATIONS developers.google.com [online], "Marker Clustering," 2019 [retrieved on Dec. 16, 2019], retrieved from: URL <https://developers.google.com/maps/documentation/javascript/marker-clustering>, 6 pages.

Pointinside., "Indoor Mapping and the Retail Store," Point Inside, 3 pages, Jan. 18, 2021.

stackoverflow.com [online], "How to hide marker when zoom out?," Apr. 2016, [retrieved on Dec. 17, 2019], retrieved from: URL <https://stackoverflow.com/questions/36244982/how-to-hide-marker-when-zoom-out>, 3 pages.

stackoverflow.com [online], "How to hide point labels at certain zoom levels in mapbox-gl-js?," Nov. 2016, [retrieved on Dec. 17, 2019], retrieved from: URL <https://stackoverflow.com/questions/36244982/how-to-hide-marker-when-zoom-out>, 3 pages.

Sunday, [online] "Bounding Containers," dated 2012, retrieved from: URL http://geomalgorithms.com/a08-containers.html.

support.garmin.com [online], "Changing the Map Orientation on a Garmin Chartplotter," [retrieved on Dec. 17, 2019], retrieved from: URL <https://support.garmin.com/en-US/?faq=50vP1cqDXd3PpVMDvgKBb5>, 1 pages.

tilemill-project.github.io [online], "Advanced map design," [retrieved on Dec. 16, 2019], retrieved from: URL <https://tilemill-project.github.io/tilemill/docs/guides/advanced-map-design/>, 3 pages.

GENERATING SIMPLIFIED MAP SHAPES

CROSS-REFERENCE TO RELATED APPLICATIONS

This application is a continuation of U.S. application Ser. No. 16/717,541, filed Dec. 17, 2019 which claims priority to U.S. Application Ser. No. 62/782,070, filed on Dec. 19, 2018. The disclosure of the prior application is considered part of the disclosure of this application, and is incorporated in its entirety into this application.

TECHNICAL FIELD

This specification generally relates computer graphics, including the generation of graphical elements to represent shapes on a map within a graphical mapped space.

BACKGROUND

Digital maps of indoor and outdoor spaces have been used to help guide users as they move around those spaces. For example, digital maps have been generated and presented in applications that permit a user to zoom and scroll around the map, and in some instances, to view the user's current location superimposed at an appropriate location on the map. Items other than a user's current location can also be depicted on maps, such as presenting icons that identify places of interest for a user, such as stores, restaurants, and parks.

Digital maps often include graphical elements to represent items on the map. Graphical elements may include less than all visual details of the corresponding item they represent. For example, a road on a map may be simply represented by a straight line instead of including all of the visual details of the road, such as the road's color (e.g., asphalt color, concrete color), markings (e.g., center line), and other visual details. Graphical elements can range from simplistic (e.g., line representing a road) to complex (e.g., polygon specially generated to correspond to item).

SUMMARY

This document generally describes computer systems, processes, program products, and devices generating simplified graphical elements representing objects for presentation on maps using various different bounding algorithms for different objects. Simplified graphical elements for presentation on a map, also referred to as map shapes, can accurately represent the contours of objects using a minimal set of graphical features, such as lines, corners, curves, and other graphical features. Simplified graphical elements can be useful in a variety of contexts, such as for depicting objects on a map with enough detail so that users can readily navigate, orient, and locate items on the maps with a minimal amount of effort. Graphical maps that include detailed graphical elements representing objects, such as elements that include near-real world details, can be difficult for users to navigate and use effectively because the additional and superfluous map details may distract users from the features that are at issue. Additionally, generating simplified graphical elements that accurately represent real world objects but without too much details to distract user attention can be a challenge, particularly when generating graphical elements for more complex real world objects. This document describes techniques, systems, processes, and devices for consistently and accurately generating maps with simplified graphical elements from various different map data sources, which can include data sources with complex, disjointed, and highly detailed data on real world objects.

For example, the layout of a retail store, including all of its aisles, shelving, racks, and other physical the aisles and other arrangements in a retail store can be represented by detailed data mapping the layout each item in precise detail. However, this detailed data may have too much detail to be useful to guests (e.g., guests may have difficultly readily differentiating details on the map that are relevant to them from irrelevant map details). Generating simplified graphical elements for a map, which can be more useful to such guests, from detailed map data can be non-trivial for a variety of reasons. For example, some bounding algorithms may be relatively lightweight and suitable for representing simple objects, but unsuitable for representing complex objects. Some bounding algorithms, for example, may be suitable for representing a variety of simple and complex objects, but such bounding algorithms may be relatively computationally expensive. By selecting an appropriate bounding algorithm for an object based on attributes of the object, for example, a representative shape can be generated for the object using an appropriate amount of computing resources, and an accurate map can be quickly and efficiently generated. Further, a map representation can show an appropriate level of detail by reducing visual clutter and extraneous detail.

In some implementations, a method may be performed by a graphics processing computer system for generating simplified graphical maps. The method includes receiving map data that identifies a layout of physical objects within a physical area; identifying contiguous groups of the physical objects as composite objects; selecting bounding algorithms to use for generating graphical shapes for the composite objects, the bounding algorithms being selected individually for each of the composite objects from among a plurality of bounding algorithms based on characteristics of each of the composite objects; generating graphical shapes by applying the selected bounding algorithms to the composite objects; and testing the graphical shapes against one or more criteria. For candidate graphical shapes that fail, a new bounding algorithm is selected and the generating and the testing are repeated using the new bounding algorithm. The method may include outputting a simplified graphical map that represents the physical objects within the physical area using the graphical shapes.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations may include any, all, or none of the following features. Identifying the composite objects may include generating a spatial index of the physical objects; selecting a physical object from the among the physical objects; determining, using the spatial index, whether another physical object is within a threshold distance of the selected physical object; in response to the other physical object being within the threshold distance, adding the other physical object to a composite object including the selected physical object; and selecting the other physical object and repeating the determining and the adding until no other physical objects are determined to be within the threshold distance of any shapes within the composite object. Selecting, for each of the composite objects, the bounding algorithms may include determining whether the composite object is primarily diagonally oriented within the physical area, and selecting a convex hull bounding algorithm when the composite object is primarily diagonally oriented, or otherwise selecting a bounding box algorithm. When the convex hull algorithm is selected and the composite object fails the testing against the one or more criteria, the new bounding algorithm that is selected may include a buffering bounding algorithm. The buffering bounding algorithm may include performing a buffer operation on the composite object to generate a buffered composite object, performing a union operation on the buffered composite object to generate a union composite object, and performing an unbuffer operation on the union composite object to generate the graphical shape for the composite object. For graphical shapes generated using the buffering bounding algorithm, at least one of the one or more criteria tested against the graphical shape may be that the graphical shape must include no more than one resulting shape to pass. When the buffering bounding algorithm fails the testing against the one or more criteria, the new bounding algorithm that is selected may include the convex hull bounding algorithm. When the bounding box algorithm is selected and the composite object fails the testing against the one or more criteria, the new bounding algorithm that is selected may include an orthogonal convex hull bounding algorithm. When the convex hull bounding algorithm is selected and the composite object fails the testing against the one or more criteria, the new bounding algorithm that is selected may include the buffering bounding algorithm. The buffering bounding algorithm may include performing a buffer operation on the composite object to generate a buffered composite object, performing a union operation on the buffered composite object to generate a union composite object, and performing an unbuffer operation on the union composite object to generate the graphical shape for the composite object. For graphical shapes generated using the buffering bounding algorithm, at least one of the one or more criteria tested against the graphical shape may be that the graphical shape must include no more than one resulting shape to pass. When the buffering bounding algorithm fails the testing against the one or more criteria, the new bounding algorithm that is selected may be the orthogonal convex hull bounding algorithm. At least one of the one or more criteria tested against the graphical shape may include the area of the graphical shape being within a threshold of the area of the composite object. The physical area may be a retail store and the physical objects comprise aisles within the retail store. The outputting may include storing the simplified graphical map in one or more digital files. The outputting may include presenting one or more graphical indicators on the simplified graphical map, the one or more graphical indicators representing one or more of a section location, an item location, or a user location within the simplified graphical map.

The systems, devices, program products, and processes described throughout this document can, in some instances, provide one or more of the following advantages. A map may be automatically synchronized with a physical space that the map represents, which may be useful when frequent changes are made to the space and/or when maps for many various spaces are maintained. When rendering a map of a space, a visual representation of a complex object in the space may be simplified to reduce visual clutter. By aggregating and simplifying objects, an amount of data needed for rendering a map may be reduced, improving network transfer speed and improving rendering speed on a device that renders the map. Further, a different software application may be used to render a map than a software application that was used to create it, potentially conserving computer storage space and processing power. A spatial index that includes pre-generated and stored object position data can be accessed to quickly identify contiguous objects when generating a simplified composite object. By selecting a suitable bounding algorithm for generating a shape to represent an object, overall use of computing resources may be minimized while ensuring that objects are visually well-represented in a map.

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can generate simplified map shapes to represent objects in a map, using various different bounding algorithms for different objects. In general, generating maps that include an appropriate level of detail may be challenging, since map source data (e.g., computer design files used to map an indoor space) may include extraneous details that produce visual clutter when directly rendered. For example, a store map may define various sections that make up an aisle—such detail may be appropriate for some purposes (e.g., providing a store design map on a large monitor to an employee), but not appropriate for others (e.g., providing a map on a mobile device screen to a customer). Also, some bounding algorithms used for generating shapes to represent objects in a map may produce accurate shapes, but may be computationally expensive. To solve the problem of generating maps that include an appropriate level of detail while conserving computing resources, for example, an appropriate bounding algorithm can be selected for an object based on attributes of the object, and different bounding algorithms may be selected for different objects. Thus, representative shapes can be generated for objects using an appropriate amount of computing resources, and an accurate map can be quickly and efficiently generated.

Figure 1:
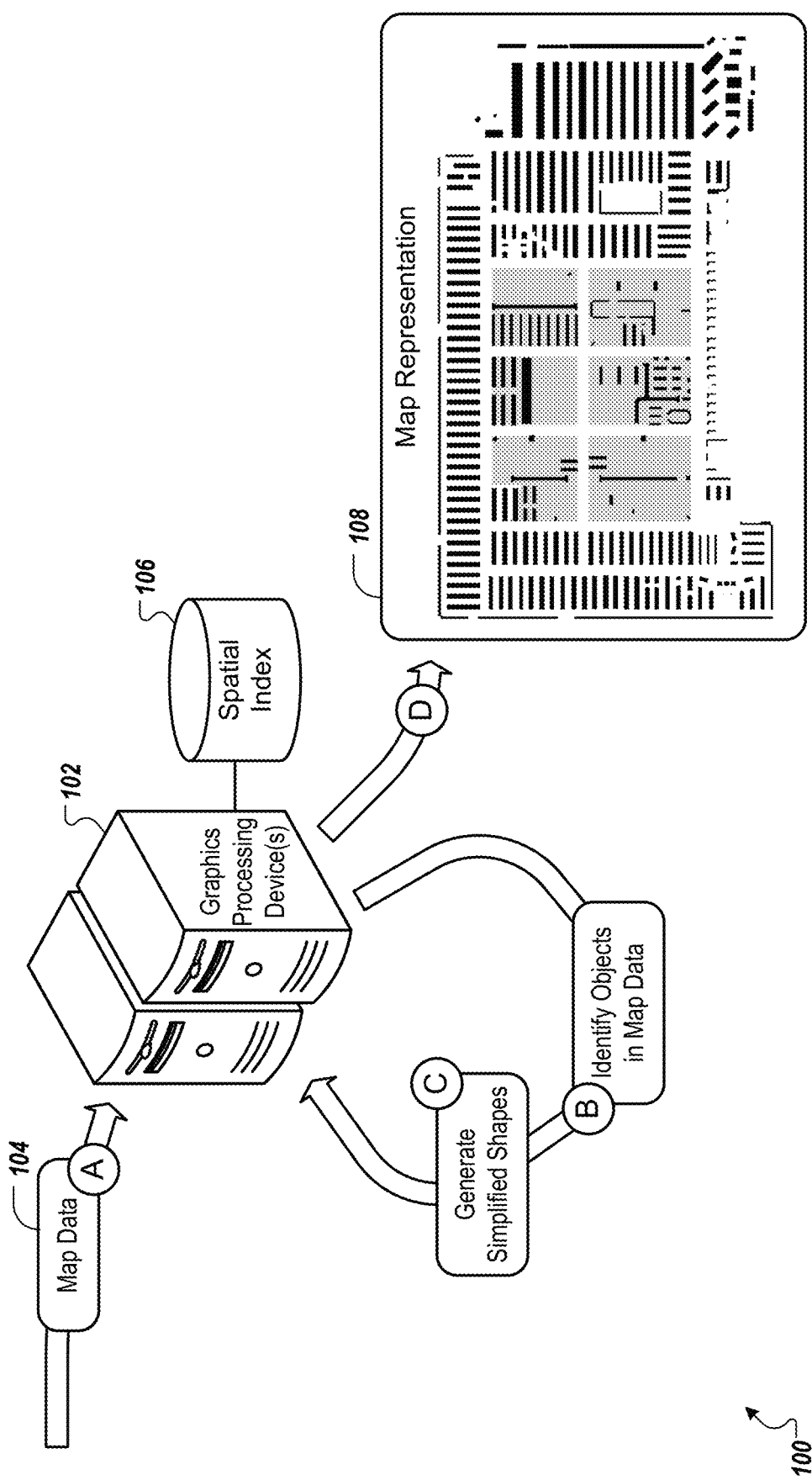
FIG. 1 is a conceptual diagram of an example system for generating simplified map shapes for a map representation.

FIG. 1 is a conceptual diagram of an example system 100 for generating simplified map shapes for a map representation. In the depicted example, the system 100 includes one or more graphics processing devices 102. In some examples, the graphics processing device 102 can represent various forms of computing servers, including, but not limited to network servers, web servers, application servers, or a server farm. In some examples, the graphics processing device 102 can represent various forms of computing devices including, but not limited to, a desktop computer, a laptop computer, a handheld computer, or a combination of two or more of these computing devices or other computing devices. The graphics processing device 102, for example, can receive map data from various sources (e.g., databases, file systems, and/or cached data sources), can execute software that processes the received map data, and can generate processed map data that may be used to render map representations that include simplified map shapes.

Figure 2:
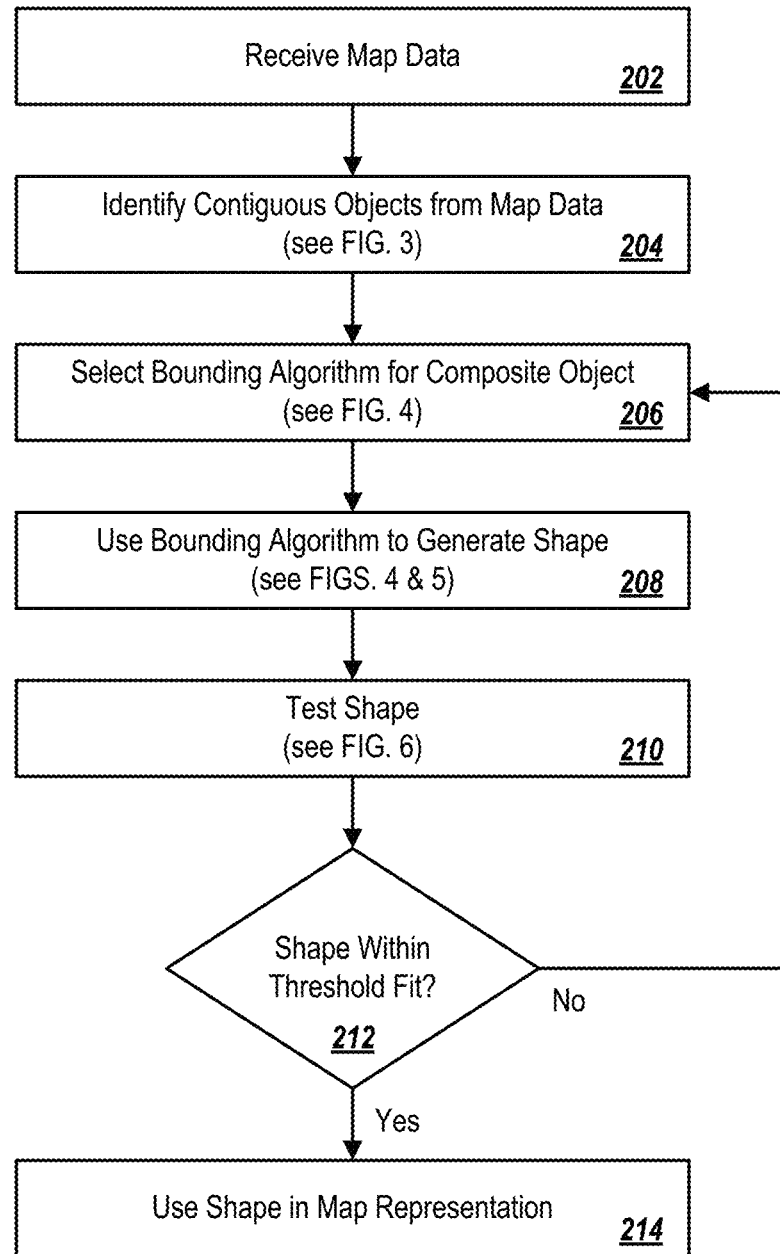
FIG. 2 shows an example process for generating simplified map shapes for a map representation.

Referring now to FIG. 2, an example process 200 for generating simplified map shapes for a map representation is shown. The process 200 can be performed by components of the system 100, for example, and will be described with reference to FIG. 1. However, other systems may be used to perform the same or similar process.

At box 202, map data is received. Referring to FIG. 1, during stage (A), the graphics processing device 102 receives map data 104. For example, the map data 104 can include data that defines various objects within a mapped space, and can be received over a computing network from a map data source (e.g., a database, a file system, and/or a cached data source, not shown). In some implementations, map data may be provided in a computer file format generated by a software application used for designing a mapped space. For example, the map data 104 can be a computer-aided design (CAD) file, or another suitable computer file.

At box 204, contiguous objects are identified from the received map data. Referring again to FIG. 1, during stage (B), the graphics processing device 102 identifies objects in the map data 104. In some implementations, map data may define lines and points that designate the outlines and positions of objects in a mapped space. In some implementations, map data may include metadata that designates object classifications for at least some of the objects defined in the map data. For example, the map data 104 can define the outlines, positions, and optional classifications of objects of various types (e.g., sections, aisles, floor areas, walls, registers, and other suitable types) within an indoor mapped space such as a store or warehouse. An aisle, for example, can include a series of contiguous sections for storing items within a mapped space, each section having a defined position and width (e.g., five feet, ten feet, or another suitable width) along the aisle. A floor area, for example, can be a defined area within a mapped space which may be associated with one or more types of items (e.g., clothing, groceries, or other item types). A register, for example, can be a defined station area used for processing the items (e.g., scanning, packaging, or another sort of processing). Walls, for example, can include defined interior and exterior walls of a mapped space.

Referring again to FIG. 2, a shape can be generated to represent a composite object (e.g., multiple contiguous objects or a single object), and the shape can be used in a map representation. In general, generating a shape to represent an object can include identifying contiguous objects (or a single non-contiguous object) from map data (box 204, described in further detail with respect to FIG. 3), selecting a bounding algorithm for a composite object (box 206, described in further detail with respect to FIG. 4), using the selected bounding algorithm to generate a shape (box 208, described in further detail with respect to FIGS. 4 & 5), and testing the generated shape (box 210, described in further detail with respect to FIG. 6). If the shape is not within a threshold fit (box 212), a different bounding algorithm can be selected for the object (box 206), and the process 200 can iterate until an acceptable fit is determined for the shape with respect to the object. If the shape is within a threshold fit, for example, at box 214, the graphics processing device 102 can use the shape to represent the object in map representation 108 (shown in FIG. 1). In some implementations, a shape may be generated for a composite object after the composite object has been determined, before determining other composite objects. In some implementations, shapes may be generated for composite objects, after all of the composite objects in a mapped space have been determined.

Referring again to FIG. 1, during stage (C), the graphics processing device 102 generates simplified shapes for objects identified in the map data 104. In general, computer files generated by software applications for designing mapped spaces (e.g., CAD files) may include many details, and may not be suitable for some purposes because of an amount of visual clutter that would result if a file were to be visually rendered. For example, a CAD file for a store map may include line segments for each section of an aisle. When rendering the store map for presentation to a customer, for example, it may be preferable to provide a visual representation of the aisle as a single object rather than visually define each section of the aisle, to reduce visual clutter. Further, computer files generated by software applications for designing mapped spaces (e.g., CAD files) may be large because of an amount of data needed for rendering the many details defined in the files. By aggregating and simplifying objects defined in the map data 104, for example, an amount of data needed for rendering the store map may be reduced, improving network transfer speed and improving rendering speed on a device (e.g., a stationary or mobile computing device) that renders the store map. Further, software applications for creating and rendering map files may use a significant amount of computer storage space and processing power, and by aggregating and simplifying objects defined in the map data 104, for example, a different software application may be used to render a representation of the store map than the one that created it—one that uses fewer computing resources.

Figure 3:
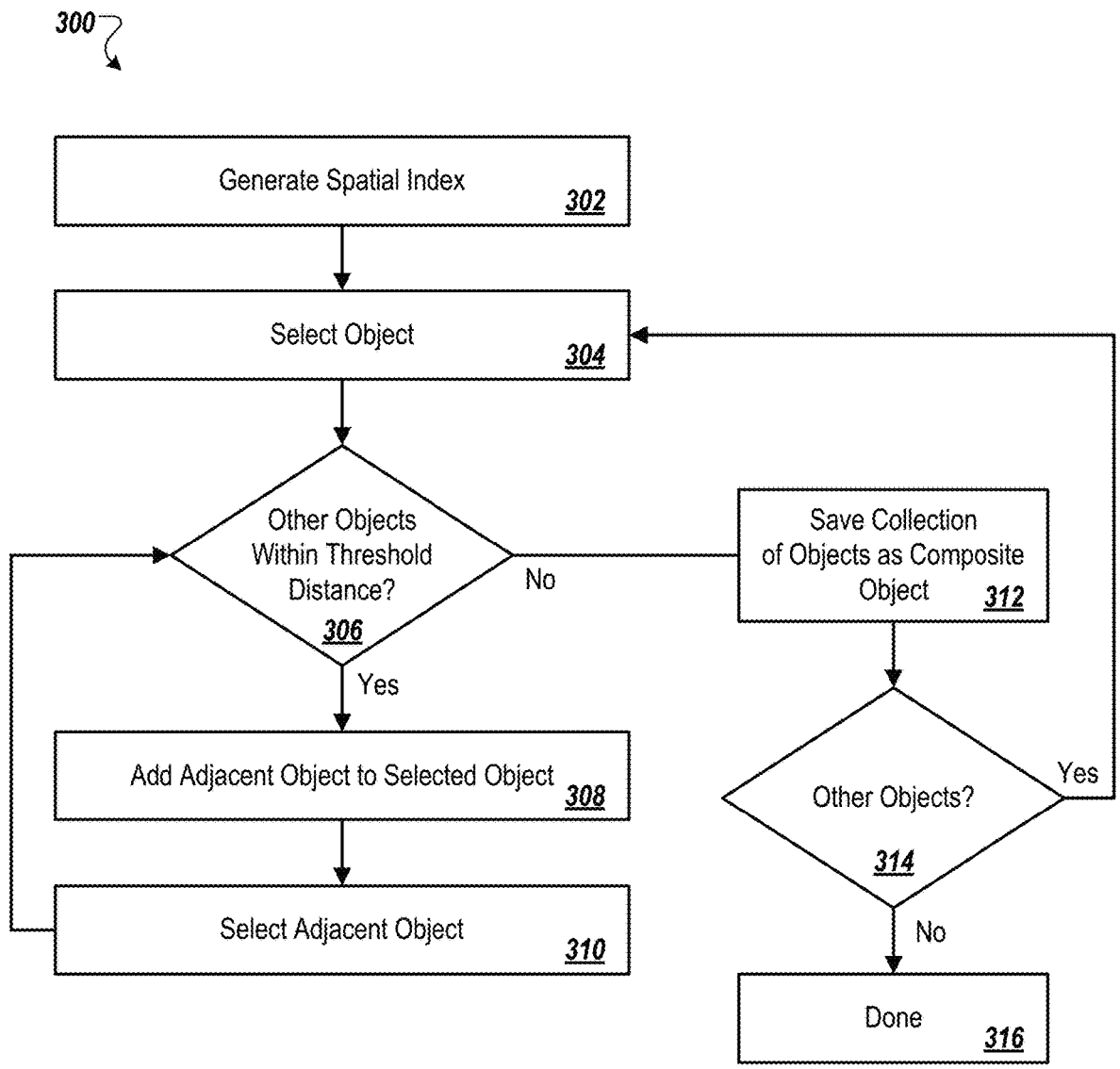
FIG. 3 shows an example process for identifying contiguous objects from map data and generating a composite object.

Referring now to FIG. 3, an example process 300 is shown for identifying contiguous objects from map data and generating a composite object that includes the contiguous objects (corresponding to box 204 of FIG. 2). At box 302, a spatial index is generated from the received map data. As shown in FIG. 1, for example, the graphics processing device 102 can generate spatial index 106 to include position data for objects defined in the received map data 104. For example, each object defined in the map data 104 can be associated with an object identifier and object position data that designates the object's outline and position with respect to a mapped space. The object position data, for example, can define a set of lines and points according to a Cartesian coordinate system that includes x and y position values for the points, and line connections between the points. In some implementations, a centroid value may be calculated and indexed for each object. The spatial index 106 (e.g., a database index, a file index, a cached index, or another suitable index), for example, can be generated and stored such that, for any given object, other objects that are close to the given object (e.g., within a configurable threshold distance) may be readily identified.

Figure 7A:
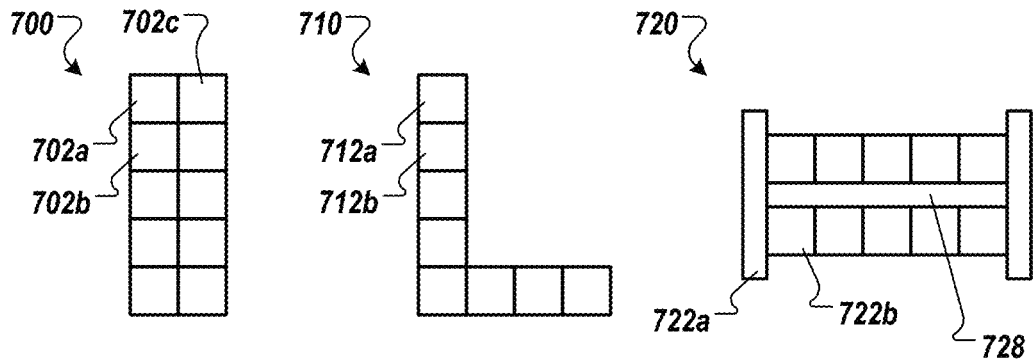
FIGS. 7A-C show example applications of bounding algorithms to generate shapes based on primarily orthogonal objects.

Referring now to FIG. 7A, example composite objects 700, 710, and 720 are shown. Each of the example composite objects 700, 710, and 720 includes multiple contiguous objects, however, in some examples, a single object may be identified which may not be contiguous with any other objects. Further, each of the contiguous objects included in the composite objects 700, 710, and 720 shown in the present example are primarily orthogonal with respect to a coordinate system, however, other contiguous objects may be identified which may be primarily non-orthogonal (e.g., diagonal) with respect to the coordinate system. In the present example, composite object 700 includes contiguous objects 702a, 702b, 702c, etc., composite object 710 includes contiguous objects 712a, 712b, etc., and composite object 720 includes contiguous objects 722a, 722b, etc.

Referring again to FIG. 3, at box 304, an object defined in the map data 104 is selected. In some implementations, an object may be selected randomly. In some implementations, an object may be selected according to its defined position within a mapped space. For example, a first object may be selected that is closest to a corner of the mapped space. As another example, a first object may be selected that is closest to a center of the mapped space. As shown in FIG. 7A, for example, object 702a can be first selected by the graphics processing device 102. In the present example, object 702a can represent a section of an aisle in a store.

At box 306, the graphics processing device 102 determines whether any other objects are within a threshold distance of the selected object. The threshold distance, for example, can be a configurable distance (e.g., one inch, six inches, one foot, two feet, or another suitable distance) between centers, points, or edges of objects according to a coordinate system of a mapped space in which the objects are located. In some implementations, a definition of a threshold distance between objects may vary depending on an object's classification, and determining whether any other objects are within the threshold distance of the selected object may include identifying the selected object's classification and the corresponding threshold distance for objects of that classification. For example, a threshold distance between objects of one type (e.g., sections) can be of a first value, and a threshold distance between objects of another type (e.g., floor areas) can be of a second, different value. In the present example, the graphics processing device 102 identifies object 702a as a section (e.g. based on metadata associated with the object), identifies a corresponding threshold distance for section objects, and determines that objects 702b and 702c (e.g., other sections) are within the threshold distance. For example, the graphics processing device 102 can access the spatial index 106 (shown in FIG. 1), and can quickly identify other objects within the threshold distance based on the pre-generated and stored object position data.

At box 308, after determining that one or more objects are within a threshold distance of a selected object, the adjacent object(s) are added to the selected object. For example, the graphics processing device 102 can maintain a data structure (e.g., a list, an array, a collection, or another suitable data structure) that stores object identifiers for contiguous objects that are included in a composite object. In the present example, adjacent objects 702b and 702c can be added to a data structure associated with the composite object 700, along with the selected object 702a.

At box 310, an adjacent object is selected. In the present example, the graphics processing device 102 can select one of the adjacent objects 702b or 702c. After selecting one of the adjacent objects 702a or 702b, for example, the graphics processing device 102 can determine whether any other objects (e.g., objects that have not yet been added to the data structure associated with composite object 700) are within a threshold distance of the selected adjacent object, and the process 300 for identifying contiguous objects can iterate until all contiguous objects have been identified for the composite object 700.

After determining that no remaining objects are within a threshold distance of a selected object, a collection of objects can be saved as a composite object at box 312. In the present example, the graphics processing device 102 can save the contiguous objects 702a, 702b, 702c, etc., (e.g., sections) as composite object 700 (e.g., an aisle). In some examples, a single object can be saved as a composite object.

At box 314, the graphics processing device 102 determines whether any other objects (e.g., objects that have not yet been included as part of a composite object) are defined in the map data 104. Referring again to FIG. 7A, for example, object 712a can be selected by the graphics processing device 102 (at box 304), and the process 300 can iterate until all contiguous objects 712b, etc., have been added to and saved as composite object 710. Similarly, object 722a can be selected, and the process 300 can iterate until all contiguous objects 722b, etc., have been added to and saved as composite object 720.

At box 316, after determining that no other objects remain, the process 300 for identifying contiguous objects may be complete. For example, the graphics processing device 102 can determine that all of the objects defined in the map data 104 and/or identified in the spatial index 106 have been saved as part of a composite object (which may include multiple contiguous objects or may be a single object).

Figure 4:
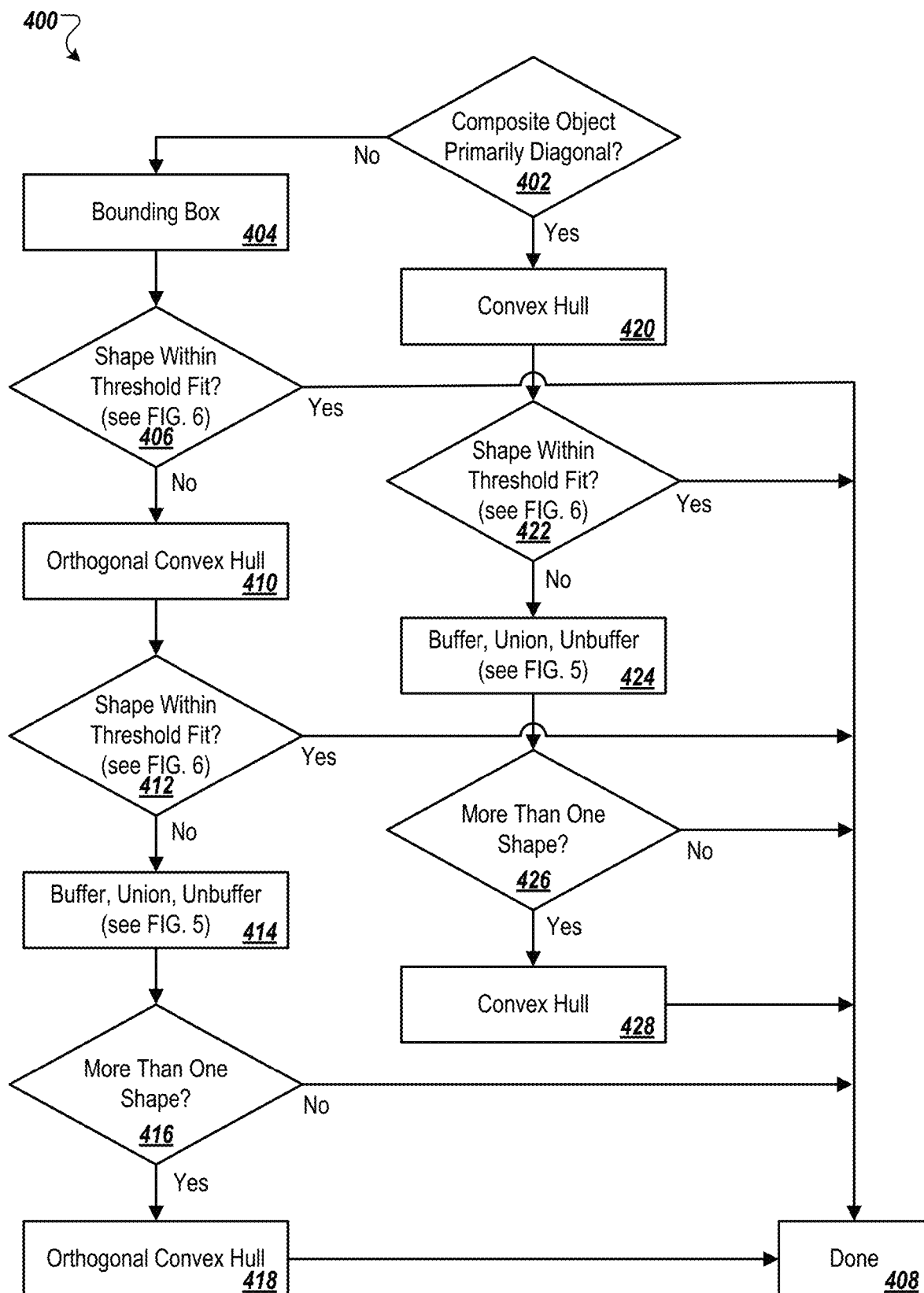
FIG. 4 shows an example process for selecting a bounding algorithm for an object and using the bounding algorithm to generate a shape.

Referring now to FIG. 4, an example process 400 is shown for selecting a bounding algorithm for an object and using the bounding algorithm to generate a shape to represent the object in a map representation (corresponding to box 206 of FIG. 2). In general, different bounding algorithms may be appropriate for generating shapes for representing different objects. Some simple objects may be visually well-represented using simple bounding algorithms that may be efficiently performed by the graphics processing device 102, for example. Some complex objects, however, may not be visually well-represented using simple bounding algorithms, but may be better represented by more complex bounding algorithms that use more processing resources. By selecting a suitable bounding algorithm for generating a shape to represent an object, for example, overall use of processing resources may be minimized while ensuring that objects are visually well-represented in a map representation.

At box 402, the graphics processing device 102 determines whether a composite object is primarily diagonal or orthogonal. In some implementations, a determination of whether a composite object is primarily diagonal or orthogonal may be based on analyzing lines included in the composite object with respect to a coordinate system. For example, the graphics processing device 102 can count a number of lines that are oriented in a mapped space within a threshold tolerance value (e.g., one degree, five degrees, ten degrees, or another suitable tolerance value) of one of the axes of a coordinate system of the mapped space (e.g., either an x axis or a y axis). If a predetermined percentage (e.g., 50%, 80%, 90%, or another suitable value) of the lines of the composite object are orthogonal with respect to the coordinate system, for example, the object may be classified as being primarily orthogonal, whereas if the predetermined percentage value is not met, the object may be classified as being primarily diagonal. Referring again to FIG. 7A, for example, the composite objects 700, 710, and 720 are primarily orthogonal objects.

Figure 7B:
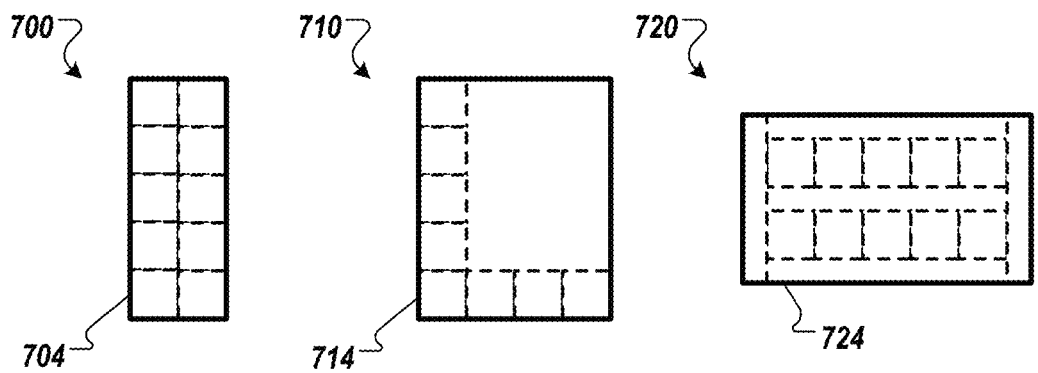

At box 404, if a composite object is not primarily diagonal (e.g., the object is primarily orthogonal), a bounding box algorithm is applied to the object. In some implementations, a bounding box algorithm may include determining a minimum bounding rectangle that includes all points of an object. Referring now to FIG. 7B, for example, using the bounding box algorithm, shape 704 can be generated by the graphics processing device 102 for composite object 700 (e.g., a straight aisle that includes contiguous sections), shape 714 can be generated for composite object 710 (e.g., an L-shaped aisle that includes contiguous sections), and shape 724 can be generated for composite object 720 (e.g., a refrigeration aisle that includes contiguous sections and endcaps).

Figure 6:
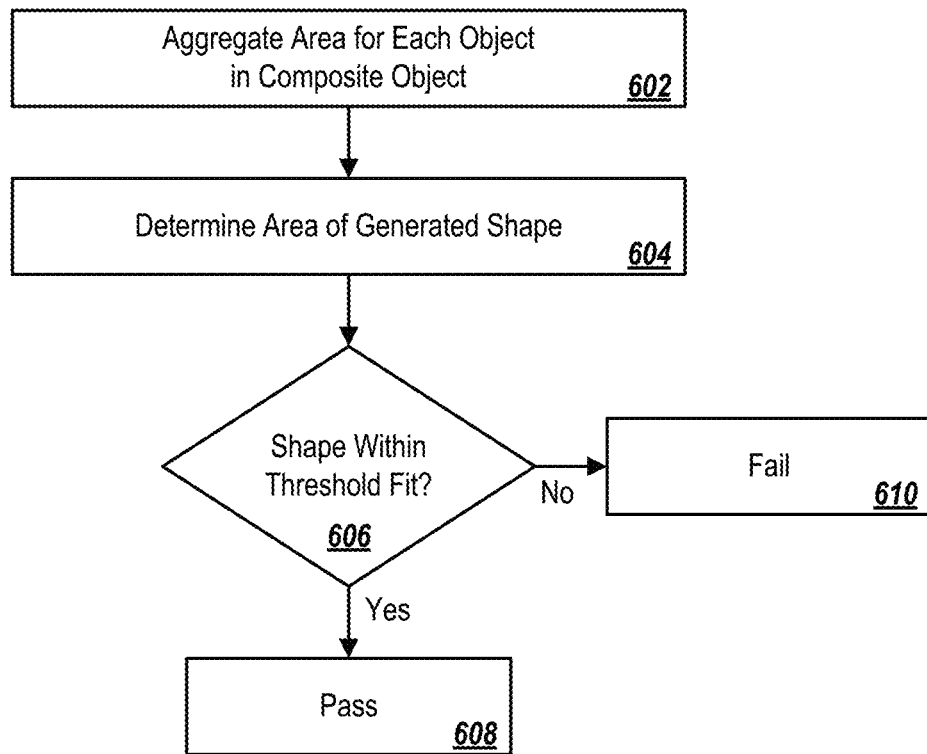
FIG. 6 shows an example process for testing a shape.

Referring again to FIG. 4, at box 406, the graphics processing device 102 tests a generated shape to determine whether the shape is within a threshold fit with respect to an object which the shape represents. Referring now to FIG. 6, an example process 600 for testing a shape is shown.

At box 602, the areas of each object in a composite object are aggregated. Referring again to FIG. 7A, for example, the areas of contiguous objects 702a, 702b, 702c, etc., are aggregated for composite object 700. Similarly, the areas of contiguous objects 712a, 712b, etc., are aggregated for composite object 710. In the present example, the areas of contiguous objects 722a (e.g., an endcap), 722b (e.g., a section), etc., are aggregated for composite object 720 (e.g., a refrigeration aisle), however, area 728 (e.g., a void area which houses electrical components) may not be included in the area aggregation.

At box 604, an area of a generated shape is determined. Referring again to FIG. 7B, for example, the areas of shape 704 (e.g., generated for composite object 700), shape 714 (e.g., generated for composite object 710), and shape 724 (e.g., generated for composite object 720) can be determined.

At box 606, the graphics processing device 102 determines whether a shape that has been generated to represent a composite object is within a threshold fit of the composite object. In some implementations, determining whether a generated shape is within a threshold fit may include determining whether an area of the shape is within a predetermined threshold difference (e.g., 10%, 20%, 30%, or another suitable value) of an aggregated area of contiguous objects in a composite object that the shape represents.

At box 608, a shape passes the testing process 600 when the shape is within a threshold fit of its corresponding composite object. Referring again to FIG. 7B, for example, the shape 704 is within a threshold fit of the composite object 700, and is thus a suitable representation for the object.

At box 610, a shape fails the testing process 600 when the shape is not within a threshold fit of its corresponding composite object. Referring again to FIG. 7B, for example, the shape 714 is not within a threshold fit of the composite object 710, and the shape 724 is not within a threshold fit of the composite object 720, and thus neither shape is a suitable representation of its corresponding object.

Referring again to FIG. 4, for example, the process 400 for selecting a bounding algorithm for the composite object 700 (e.g., the straight aisle that includes contiguous sections) and using the selected bounding algorithm to generate a shape to represent the object is complete (box 408). Thus, in the present example, the shape 704 (shown in FIG. 7B) may be used to represent the composite object 700 in a representation of a mapped space that includes the object (e.g., map representation 108, shown in FIG. 1). However, for composite objects 710 and 720, the process 400 continues, and different bounding algorithms may be tested and possibly used for generating shapes to represent the objects.

Figure 7C:
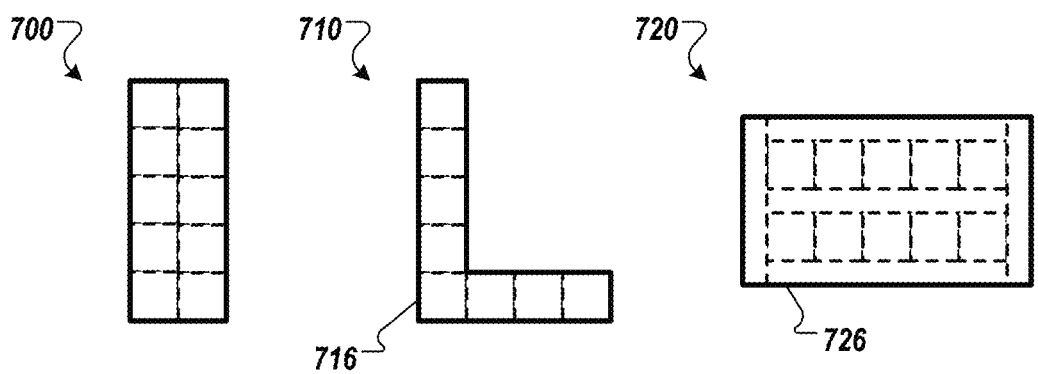

At box 410, an orthogonal convex hull bounding algorithm is applied to an object. In some implementations, the orthogonal convex hull bounding algorithm may include computing a rectilinear convex hull that encloses a set of objects included in a composite object. Referring now to FIG. 7C, for example, using the orthogonal convex hull bounding algorithm, shape 716 can be generated for composite object 710, and shape 726 can be generated for composite object 720.

Referring again to FIG. 4, at box 412, the graphics processing device 102 tests a generated shape to determine whether the shape is within a threshold fit with respect to an object which the shape represents, according to the process 600 (shown in FIG. 6). In the present example, the shape 716 (shown in FIG. 7C) is within a threshold fit of the composite object 710 (also shown in FIG. 7C), and is thus a suitable representation for the object. Thus, the process 400 for selecting a bounding algorithm for the composite object 710 (e.g., the L-shaped aisle that includes contiguous sections) and using the selected bounding algorithm to generate a shape to represent the object is complete (box 408). However, in the present example, the shape 726 (shown in FIG. 7C) is not within a threshold fit of the composite object 720, thus the process 400 continues for that object, and different bounding algorithms may be tested and possibly used for generating a shape to represent the object.

Figure 5:
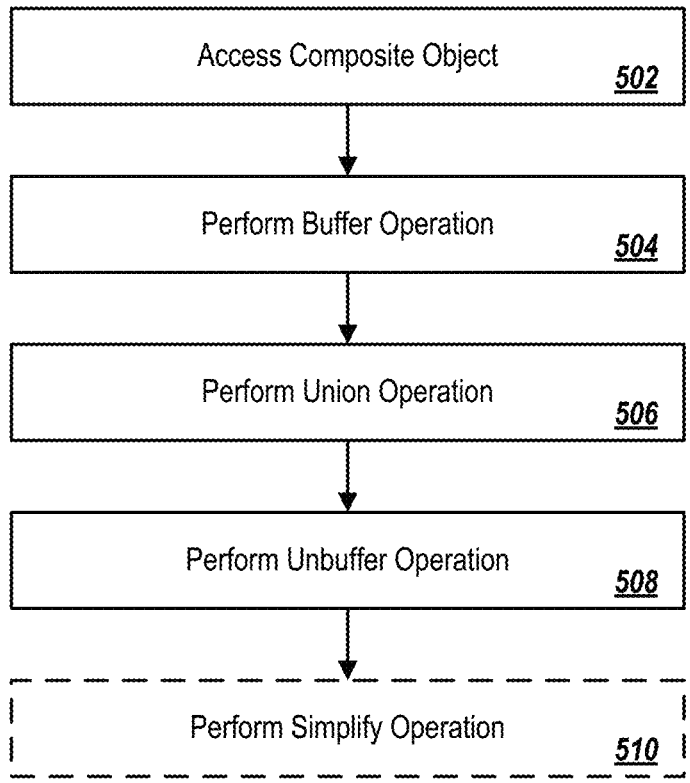
FIG. 5 shows an example process for a bounding algorithm including buffer, union, and unbuffer operations.

At box 414, a bounding algorithm that includes buffer, union, and unbuffer operations is applied to an object. Referring now to FIG. 5, an example process 500 for a bounding algorithm including buffer, union, and unbuffer (and optionally, simplify) operations is shown. Although the example process 500 may be a computationally expensive process relative to some other bounding algorithms (e.g., a bounding box algorithm), the process 500 may be selectively applied to generate shapes that accurately represent complex objects, when other bounding algorithms fail to produce satisfactory results.

At box 502, a composite object is accessed. For example, the graphics processing device 102 can generate access the composite object 720 (e.g., a refrigeration aisle that includes contiguous sections and endcaps) to generate and test a shape to represent the object.

Figure 8A:
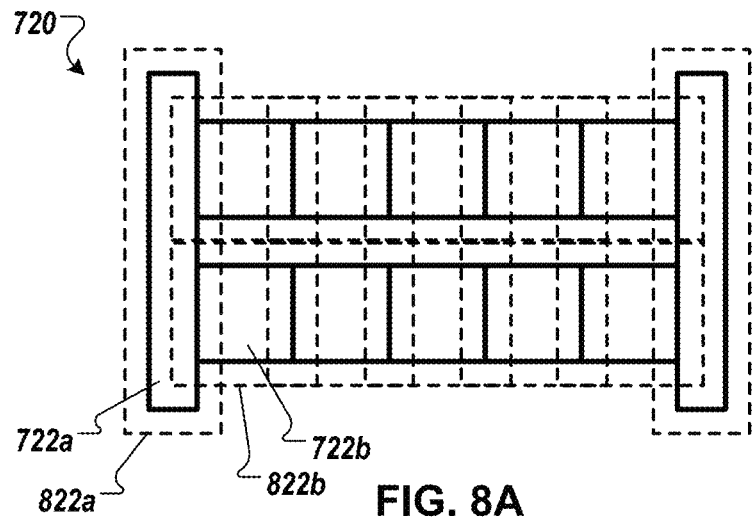
FIGS. 8A-C show an example application of a bounding algorithm including buffer, union, and unbuffer operations to generate a shape based on an object.

At box 504, a buffer operation is performed on contiguous objects included in a composite object. In some implementations, buffering an object may include moving the edges of an object away from the object's center by a predetermined distance (e.g., one inch, six inches, one foot, two feet, or another suitable distance). Referring now to FIG. 8A, for example, the graphics processing device 102 can perform a buffering operation on object 722a (e.g., an endcap), such that the edges of object 722a are extended to object border 822a, and can perform a buffering operation on object 722b (e.g., a section), such that the edges of object 722b are extended to object border 822b. Similarly, the graphics processing device 102 can perform a buffering operation on the other contiguous objects included in the composite object 720.

Figure 8B:
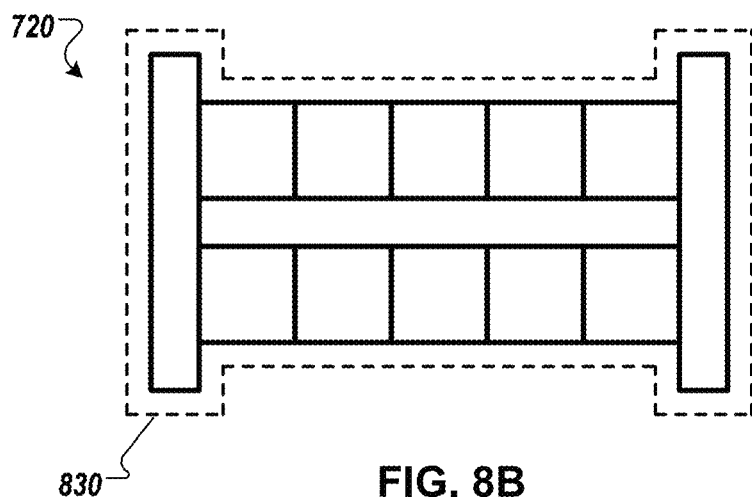

At box 506, a union operation is performed on buffered contiguous objects of a composite object. Referring now to FIG. 8B, for example, the graphics processing device 102 can perform a union operation that combines shapes that are overlapping or touching (e.g., shapes that represent the buffered objects 722a, 722b, etc., having corresponding extended object borders 822a, 822b, etc. In the present example, the union operation results in a united composite object having a border 830.

Figure 8C:
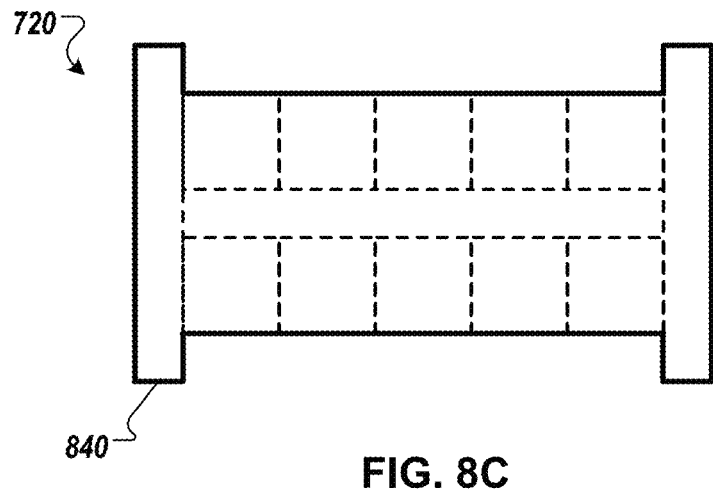

At box 508, an unbuffer operation is performed on a united composite object. In some implementations, unbuffering (e.g., shrinking) an object may include moving the edges of an object toward the object's center by a predetermined distance (e.g., one inch, six inches, one foot, two feet, or another suitable distance) that had been applied in previous buffering operations, such that the effect of the previously performed buffering operations are reversed. Referring now to FIG. 8C, for example, the graphics processing device 102 can perform an unbuffer operation on the united composite object having the border 830 (shown in FIG. 8B) to generate shape 840 which represents the composite object 720.

At box 510, a simplify operation is optionally performed on a composite object after it has been unbuffered, or is optionally performed as part of performing an unbuffering operation. For example, the simplify operation may include determining whether a composite object is represented by a complex shape (e.g., based on the shape having a number of points that meets a threshold number of points). If the composite object is represented by a complex shape, for example, simplifying the complex shape may include generating a simplified polygon that has fewer visual prominences (e.g., by including fewer points).

Referring again to FIG. 4, the graphics processing device 102 determines at box 416 whether more than one shape has been generated by the bounding algorithm that includes buffer, union, and unbuffer operations. If more than one shape has been generated, at box 418 the shape that has been previously generated using the orthogonal convex hull bounding algorithm (e.g., at box 410) may be used to represent a composite object (e.g., shape 724 may be used to represent composite object 720, shown in FIG. 7B). If only one shape has been generated, the shape that has been generated by the bounding algorithm that includes buffer, union, and unbuffer operations (e.g., shape 840, shown in FIG. 8C) may be used to represent the composite object. In either scenario, the process 400 for selecting a bounding algorithm for the composite object 720 is complete (box 408).

Figure 9A:
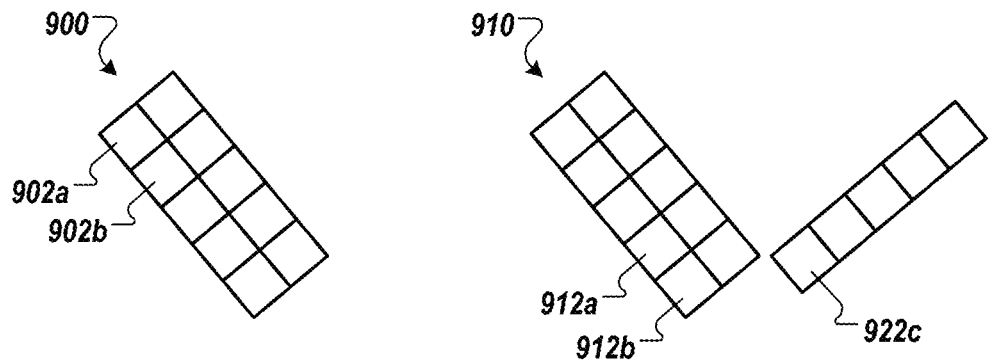
FIGS. 9A-C show example applications of bounding algorithms to generate shapes based on primarily diagonal objects.

Returning to box 402, the graphics processing device 102 determines whether a composite object is primarily diagonal or orthogonal. Referring now to FIG. 9A, for example, composite object 900 and composite object 910 are identified as being primarily diagonal objects. In the present example, composite object 900 (e.g., a diagonally-orientated series of contiguous sections) includes sections 902a, 902b, etc., and composite object 910 (e.g., a pair of adjacent diagonally-oriented series of contiguous sections) includes sections 912a, 912b, 912c, etc.

Figure 9B:
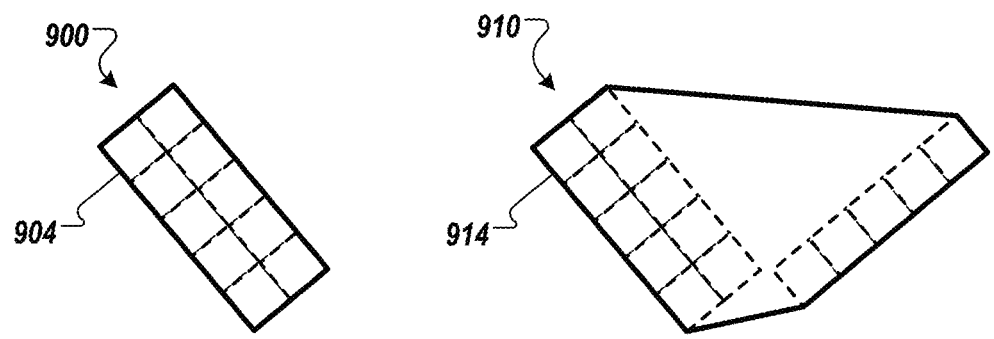

At box 420, if a composite object is primarily diagonal (e.g., the object is not primarily orthogonal), a convex hull algorithm bounding is applied to the object. In some implementations, a convex hull bounding algorithm may include determining a convex polygon that encloses a set of objects included in a composite object. Referring now to FIG. 9B, for example, using the convex hull bounding algorithm, shape 904 can be generated for composite object 900, and shape 914 can be generated for composite object 910. In some implementations, a composite object that is primarily diagonal may be rotated, an orthogonal convex hull algorithm may be applied to the object, and the resulting shape may be rotated back to an original position of the composite object.

Referring again to FIG. 4, at box 422, the graphics processing device 102 tests a generated shape to determine whether the shape is within a threshold fit with respect to an object which the shape represents, according to the process 600 (shown in FIG. 6). In the present example, the shape 904 (shown in FIG. 9B) is within a threshold fit of the composite object 900 (also shown in FIG. 9B), and is thus a suitable representation for the object. Thus, the process 400 for selecting a bounding algorithm for the composite object 900 (e.g., the diagonally-orientated series of contiguous sections) and using the selected bounding algorithm to generate a shape to represent the object is complete (box 408). However, in the present example, the shape 914 (shown in FIG. 9B) is not within a threshold fit of the composite object 910, thus the process 400 continues for that object, and different bounding algorithms may be tested and possibly used for generating a shape to represent the object.

Figure 9C:
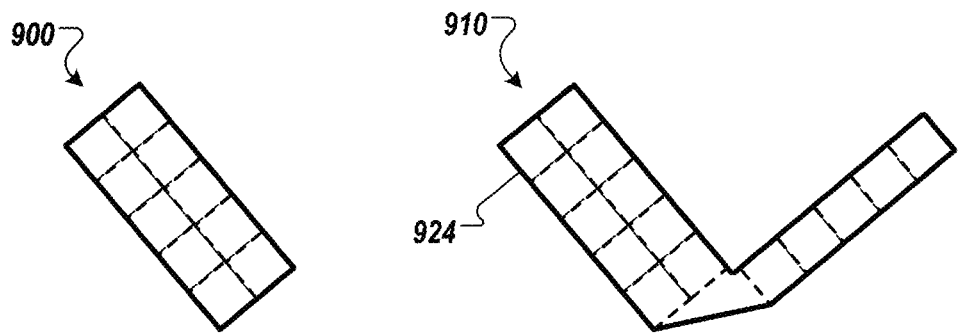

At box 424, a bounding algorithm that includes buffer, union, and unbuffer operations is applied to an object, according to the example process 500 described herein with respect to FIG. 5. Referring now to FIG. 9C, for example, the graphics processing device 102 can generate the shape 924 to represent the composite object 910 using the bounding algorithm that includes buffer, union, and unbuffer operations.

Referring again to FIG. 4, the graphics processing device 102 determines at box 426 whether more than one shape has been generated by the bounding algorithm that includes buffer, union, and unbuffer operations. If more than one shape has been generated, at box 428 the shape that has been previously generated using the convex hull bounding algorithm (e.g., at box 420) may be used to represent a composite object (e.g., shape 914 may be used to represent composite object 910, shown in FIG. 9B). If only one shape has been generated, the shape that has been generated by the bounding algorithm that includes buffer, union, and unbuffer operations (e.g., shape 924, shown in FIG. 9C) may be used to represent the composite object. In either scenario, the process 400 for selecting a bounding algorithm for the composite object 910 is complete (box 408).

Referring again to FIG. 2, at box 214, a generated shape can be used to represent a composite object in a map representation. As shown in FIG. 1, during stage (D), for example, the graphics processing device 102 can include the generated shape in map representation 108, along with other shapes that have been generated to represent other composite objects. The map representation 108, for example, can include shape data that can be used by a requestor computing device (not shown) to graphically render a map. As another example, the map representation 108 can graphically render a map, and may provide the map representation 108 as a rendered image. In some implementations, one or more graphical indicators (e.g., labels, icons, markers, or other suitable indicators) may be added to a map representation. For example, the graphics processing device 102 (or another device) can add one or more graphical indicators to the map representation 108 that identify sections within the map (e.g., store departments), identify locations of items within the map (e.g., queried products), identify locations of individuals within the map (e.g., map users), or other suitable indicators. In some implementations, item and/or user location information may be used to facilitate user routing and navigation throughout a mapped space, and/or to facilitate locating items in the mapped space. For example, a computing device that presents the map representation 108 to a user can also provide the user's location, an item location, and routing information that directs the user to the item.

Figure 10:
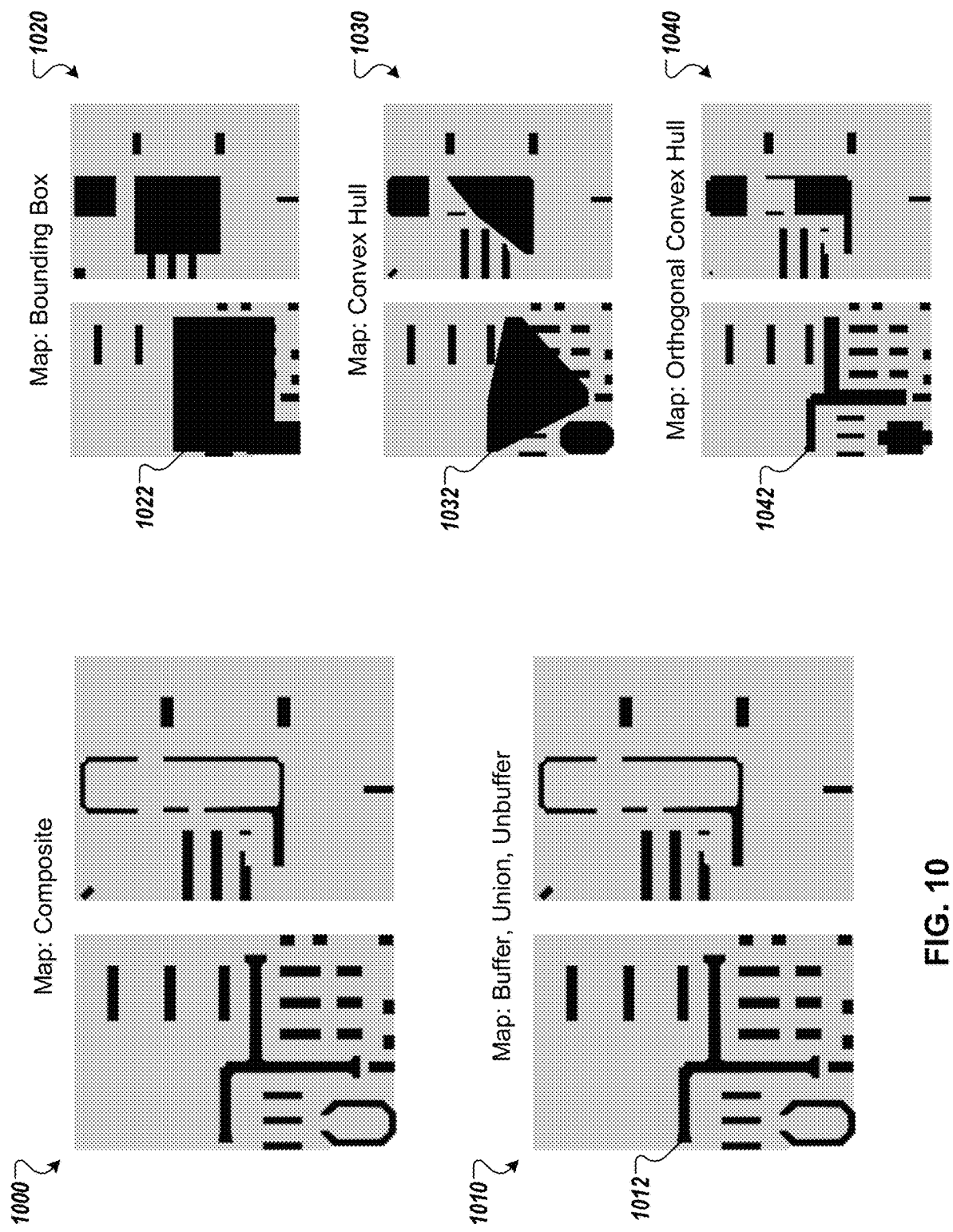
FIG. 10 shows example map representations that include shapes having been generated using different bounding algorithms.

Referring now to FIG. 10, example map representations are shown that include shapes having been generated using different bounding algorithms. Map representation 1000, for example, represents a mapped area (e.g., a store, a warehouse, or another mapped area) and includes various different simplified shapes that have been generated to represent various different composite objects within the mapped area, according to techniques described above for selecting a suitable bounding algorithm for an object and generating a shape using the selected bounding algorithm. Map representation 1000, for example, shows an appropriate level of detail for some purposes (e.g., providing a map to a store customer), by reducing visual clutter and extraneous detail that would result if the representation were to be rendered by directly using unprocessed map source data.

Each shape included in the map depicted in example map representation 1000 has been generated using an appropriate bounding algorithm—with shapes that represent relatively simple objects having been generated using relatively lightweight bounding algorithms, and shapes that represent relatively complex objects having been generated using bounding algorithms that are relatively computationally expensive. Map representation 1010, for example, has been generated using a bounding algorithm that includes buffer, union, and unbuffer operations to accurately generate shapes for all objects within a map (e.g., including complex shape 1012, representing a set of adjacent aisles, and simpler shapes representing single aisles). In the present example, map representation 1000 appears substantially similar to map representation 1010, however map representation 1000 can be generated more quickly and using fewer computing resources than map representation 1000, by selecting suitable different bounding algorithms for different represented objects.

Further, some bounding representations may not be suitable for some complex shapes. Map representation 1020, for example, has been generated using a bounding box algorithm to generate shapes for all objects with a map, which may be appropriate for some simple objects, however some complex objects may result in overly large shapes that lack detail and/or that obscure other shapes within a map (e.g., shape 1022). Map representation 1030, for example, has been generated using a convex hull bounding algorithm to generate shapes for all objects within a map, which may also be appropriate for some simple objects, but for some complex objects may also result in overly large shapes that lack detail and/or obscure other shapes (e.g., shape 1032). Map representation 1040, for example, has been generated using an orthogonal convex hull bounding algorithm to generate shapes for all objects within a map, which may also be appropriate for some simple objects, but for some complex objects may also result in overly large shapes that lack detail and/or obscure other shapes (e.g., shape 1042).

Figure 11:
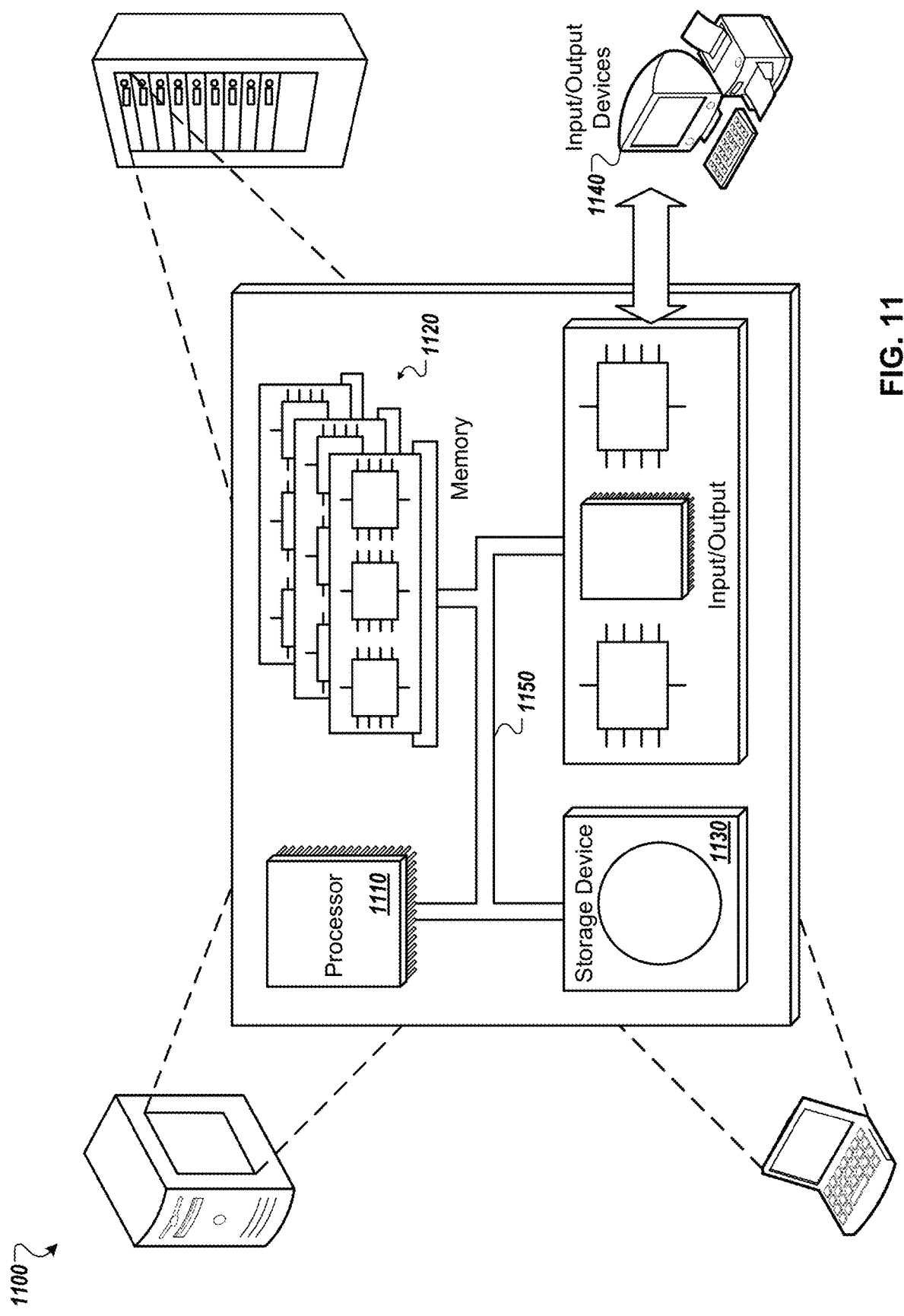
FIG. 11 is a schematic diagram that shows an example of a computing system.

FIG. 11 is a schematic diagram that shows an example of a computing system 1100. The computing system 1100 can be used for some or all of the operations described previously, according to some implementations. The computing system 1100 includes a processor 1110, a memory 1120, a storage device 1130, and an input/output device 1140. Each of the processor 1110, the memory 1120, the storage device 1130, and the input/output device 1140 are interconnected using a system bus 1150. The processor 1110 is capable of processing instructions for execution within the computing system 1100. In some implementations, the processor 1110 is a single-threaded processor. In some implementations, the processor 1110 is a multi-threaded processor. The processor 1110 is capable of processing instructions stored in the memory 1120 or on the storage device 1130 to display graphical information for a user interface on the input/output device 1140.

The memory 1120 stores information within the computing system 1100. In some implementations, the memory 1120 is a computer-readable medium. In some implementations, the memory 1120 is a volatile memory unit. In some implementations, the memory 1120 is a non-volatile memory unit.

The storage device 1130 is capable of providing mass storage for the computing system 1100. In some implementations, the storage device 1130 is a computer-readable medium. In various different implementations, the storage device 1130 may be a floppy disk device, a hard disk device, an optical disk device, or a tape device.

The input/output device 1140 provides input/output operations for the computing system 1100. In some implementations, the input/output device 1140 includes a keyboard and/or pointing device. In some implementations, the input/output device 1140 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method for generating simplified graphical maps, the method comprising:
   receiving, at a graphics processing computer system, map data that identifies a layout of physical objects within a physical area;
   identifying, by the graphics processing computer system, contiguous groups of the physical objects as composite objects;
   selecting, by the graphics processing computer system, bounding algorithms to use for generating graphical shapes for the composite objects, wherein the bounding algorithms are selected individually for each of the composite objects from among a plurality of bounding algorithms based on characteristics of each of the composite objects, wherein at least one bounding algorithm selected for at least one composite object comprises a buffering bounding algorithm;
   generating, by the graphics processing computer system, graphical shapes by applying the selected bounding algorithms to the composite objects, wherein applying the buffering bounding algorithm to the at least one composite object comprises (i) performing a buffer operation on the at least one composite object to generate a buffered composite object, (ii) performing a union operation on the buffered composite object to generate a union composite object, and (iii) performing an unbuffer operation on the union composite object to generate a graphical shape for the at least one composite object;
   testing, by the graphics processing computer system, the graphical shapes against one or more criteria, wherein for graphical shapes generated using the buffering bounding algorithm, at least one of the one or more criteria tested against the graphical shape is that the graphical shape must include no more than one resulting shape to pass, wherein for candidate graphical shapes that fail, a new bounding algorithm is selected and the generating and the testing are repeated using the new bounding algorithm; and
   outputting, by the graphics processing computer system, a simplified graphical map that represents the physical objects within the physical area using the graphical shapes.

2. The method of claim 1, wherein identifying the composite objects comprises:
   generating a spatial index of the physical objects;
   selecting a physical object from the among the physical objects;
   determining, using the spatial index, whether another physical object is within a threshold distance of the selected physical object;
   in response to the other physical object being within the threshold distance, adding the other physical object to a composite object including the selected physical object; and
   selecting the other physical object and repeating the determining and the adding until no other physical objects are determined to be within the threshold distance of any shapes within the composite object.

3. The method of claim 1, wherein selecting, for each of the composite objects, the bounding algorithms comprises:
   determining whether the composite object is primarily diagonally oriented within the physical area; and
   selecting a convex hull bounding algorithm when the composite object is primarily diagonally oriented or otherwise selecting a bounding box algorithm.

4. The method of claim 3, wherein when the convex hull bounding algorithm is selected and the composite object fails the testing against the one or more criteria, the new bounding algorithm that is selected comprises the buffering bounding algorithm.

5. The method of claim 4, wherein when the buffering bounding algorithm fails the testing against the one or more criteria, the new bounding algorithm that is selected comprises the convex hull bounding algorithm.

6. The method of claim 3, wherein when the bounding box algorithm is selected and the composite object fails the testing against the one or more criteria, the new bounding algorithm that is selected comprises an orthogonal convex hull bounding algorithm.

7. The method of claim 6, wherein when the orthogonal convex hull bounding algorithm is selected and the composite object fails the testing against the one or more criteria, the new bounding algorithm that is selected comprises the buffering bounding algorithm.

8. The method of claim 7, wherein when the buffering bounding algorithm fails the testing against the one or more criteria, the new bounding algorithm that is selected comprises the orthogonal convex hull bounding algorithm.

9. The method of claim 1, wherein performing the buffer operation on the at least one composite object comprises moving the edges of the at least one composite object away from the center of the at least one composite object by a predetermined distance.

10. The method of claim 1, wherein performing the union operation on the buffered composite object comprises combining shapes of the buffered composite object that are overlapping or touching.

11. The method of claim 1, wherein performing the unbuffer operation on the union composite object comprises moving the edges of the union composite object toward the center of the union composite object by a predetermined distance.

12. The method of claim 1, wherein applying the buffering bounding algorithm to the at least one composite object further comprises generating a simplified polygon that has fewer visual prominences than the graphical shape generated for the at least one composite object.

13. The method of claim 1, wherein at least one of the one or more criteria tested against the graphical shape comprise the area of the graphical shape being within a threshold of the area of the composite object.

14. The method of claim 1, wherein the outputting includes presenting one or more graphical indicators on the simplified graphical map, the one or more graphical indicators representing one or more of a section location, an item location, or a user location within the simplified graphical map.

15. A computer system comprising:
a data processing apparatuses including one or more processors, memory, and storage devices storing instructions that, when executed, cause the one or more processors to perform operations comprising:
  receiving, at a graphics processing computer system, map data that identifies a layout of physical objects within a physical area;
  identifying, by the graphics processing computer system, contiguous groups of the physical objects as composite objects;
  selecting, by the graphics processing computer system, bounding algorithms to use for generating graphical shapes for the composite objects, wherein the bounding algorithms are selected individually for each of the composite objects from among a plurality of bounding algorithms based on characteristics of each of the composite objects, wherein at least one bounding algorithm selected for at least one composite object comprises a buffering bounding algorithm;
  generating, by the graphics processing computer system, graphical shapes by applying the selected bounding algorithms to the composite objects, wherein applying the buffering bounding algorithm to the at least one composite object comprises (i) performing a buffer operation on the at least one composite object to generate a buffered composite object, (ii) performing a union operation on the buffered composite object to generate a union composite object, and (iii) performing an unbuffer operation on the union composite object to generate a graphical shape for the at least one composite object;
  testing, by the graphics processing computer system, the graphical shapes against one or more criteria, wherein for graphical shapes generated using the buffering bounding algorithm, at least one of the one or more criteria tested against the graphical shape is that the graphical shape must include no more than one resulting shape to pass, wherein for candidate graphical shapes that fail, a new bounding algorithm is selected and the generating and the testing are repeated using the new bounding algorithm; and
  outputting, by the graphics processing computer system, a simplified graphical map that represents the physical objects within the physical area using the graphical shapes.

16. The computer system of claim 15, wherein identifying the composite objects comprises:
  generating a spatial index of the physical objects;
  selecting a physical object from the among the physical objects;
  determining, using the spatial index, whether another physical object is within a threshold distance of the selected physical object;
  in response to the other physical object being within the threshold distance, adding the other physical object to a composite object including the selected physical object; and
  selecting the other physical object and repeating the determining and the adding until no other physical objects are determined to be within the threshold distance of any shapes within the composite object.

17. The computer system of claim 15, wherein the outputting includes presenting one or more graphical indicators on the simplified graphical map, the one or more graphical indicators representing one or more of a section location, an item location, or a user location within the simplified graphical map.

18. A non-transitory computer-readable storage medium coupled to one or more processors and having instructions stored thereon which, when executed by the one or more processors, cause the one or more processors to perform operations comprising:
  receiving, at a graphics processing computer system, map data that identifies a layout of physical objects within a physical area;
  identifying, by the graphics processing computer system, contiguous groups of the physical objects as composite objects;
  selecting, by the graphics processing computer system, bounding algorithms to use for generating graphical shapes for the composite objects, wherein the bounding algorithms are selected individually for each of the composite objects from among a plurality of bounding algorithms based on characteristics of each of the composite objects, wherein at least one bounding algorithm selected for at least one composite object comprises a buffering bounding algorithm;
  generating, by the graphics processing computer system, graphical shapes by applying the selected bounding algorithms to the composite objects, wherein applying the buffering bounding algorithm to the at least one composite object comprises (i) performing a buffer operation on the at least one composite object to generate a buffered composite object, (ii) performing a union operation on the buffered composite object to generate a union composite object, and (iii) performing an unbuffer operation on the union composite object to generate a graphical shape for the at least one composite object;
  testing, by the graphics processing computer system, the graphical shapes against one or more criteria, wherein for graphical shapes generated using the buffering bounding algorithm, at least one of the one or more criteria tested against the graphical shape is that the graphical shape must include no more than one resulting shape to pass, wherein for candidate graphical shapes that fail, a new bounding algorithm is selected and the generating and the testing are repeated using the new bounding algorithm; and outputting, by the graphics processing computer system, a simplified graphical map that represents the physical objects within the physical area using the graphical shapes.

19. The non-transitory computer-readable storage medium of claim 18, wherein identifying the composite objects comprises:

generating a spatial index of the physical objects;

selecting a physical object from the among the physical objects;

determining, using the spatial index, whether another physical object is within a threshold distance of the selected physical object;

in response to the other physical object being within the threshold distance, adding the other physical object to a composite object including the selected physical object; and selecting the other physical object and repeating the determining and the adding until no other physical objects are determined to be within the threshold distance of any shapes within the composite object.

20. The non-transitory computer-readable storage medium of claim 18, wherein the outputting includes presenting one or more graphical indicators on the simplified graphical map, the one or more graphical indicators representing one or more of a section location, an item location, or a user location within the simplified graphical map.

* * * * *